United States Patent
Bereznai (10) Patent No.: US 6,240,954 B1
(45) Date of Patent: Jun. 5, 2001

(54) BALANCE FLOAT CONTROLLED VALVE ASSEMBLY

(76) Inventor: József Bereznai, Gát u. 8. 2/21, H-1024, Budapest (HU)

(*) Notice: Subject to any disclaimer, the term of this patent is extended or adjusted under 35 U.S.C. 154(b) by 0 days.

(21) Appl. No.: 09/508,737
(22) PCT Filed: Sep. 14, 1998
(86) PCT No.: PCT/HU98/00084
   § 371 Date: Mar. 10, 2000
   § 102(e) Date: Mar. 10, 2000
(87) PCT Pub. No.: WO99/14523
   PCT Pub. Date: Mar. 25, 1999

(30) Foreign Application Priority Data

| Sep. 12, 1997 | (HU) | 9701533 |
|---|---|---|
| Sep. 12, 1997 | (HU) | 9701534 |
| Dec. 31, 1997 | (HU) | 9702556 |
| Dec. 31, 1997 | (HU) | 9702557 |
| Dec. 31, 1997 | (HU) | 9702558 |
| Feb. 23, 1998 | (HU) | 9800375 |
| Aug. 4, 1998 | (HU) | 9801787 |
| Aug. 4, 1998 | (HU) | 9801788 |

(51) Int. Cl.$^7$ ................................. F16K 31/26
(52) U.S. Cl. .......................... 137/312; 137/398
(58) Field of Search ......................... 137/312, 397, 137/398, 399

(56) References Cited

U.S. PATENT DOCUMENTS

| 2,158,750 | 5/1939 | Flaherty . |  |
|---|---|---|---|
| 2,301,972 | * 11/1942 | Richter | 137/398 |
| 2,392,126 | * 1/1946 | Dickinson | 137/399 X |
| 2,664,100 | 12/1953 | Oliverio . |  |
| 3,055,387 | 9/1962 | Eagar . |  |
| 4,830,040 | * 5/1989 | Eng | 137/399 X |
| 5,067,517 | 11/1991 | Ting-Chih et al. . |  |
| 5,072,751 | 12/1991 | Lin . |  |
| 5,230,361 | 7/1993 | Carr et al. . |  |

FOREIGN PATENT DOCUMENTS

| 0 709 607 | 5/1996 | (EP) . |
|---|---|---|
| 0 768 487 | 4/1997 | (EP) . |
| 1 223 714 | 6/1960 | (FR) . |
| 2 067 271 | 7/1981 | (GB) . |

* cited by examiner

*Primary Examiner*—Kevin Lee
(74) *Attorney, Agent, or Firm*—Wood, Herron & Evans, L.L.P.

(57) ABSTRACT

The balance float (1) controlled valve assembly of the invention includes at least one valve means (2), a liquid receptacle (4), and at least one balance float (1) connected via a link (5) to a rotatable free end of a pivoted balance lever (31). The valve means (2) comprises a closure member having a valve shaft (25) that is slideably guided between a first end position and a second end position. The valve assembly further includes a mechanism (3) that is arranged between the balance lever (31) and the valve shaft (25) of the closure member of the valve means (2). The mechanism (3) is designed so as to having and staying in an approximately self-locked state when the valve shaft (25) of the closure member of the valve means (2) stays in its first end position. The approximately self-locked state of the mechanism (3) is substantially resistant to forces biasing the valve shaft (25) towards its second end position in the sense of closing the thoroughfare flow passage through the valve means (2), but the approximately self-locked state of the mechanism (3) is easily and rapidly released by the balance lever (31) when the torque exerted onto the balance lever (31) by the weight of the balance float (1) is reduced, and the balance lever (31) is lifted and turned in a direction opposite to the torque exerted thereon by the balance float (1).

11 Claims, 6 Drawing Sheets

BALANCE FLOAT CONTROLLED VALVE ASSEMBLY

TECHNICAL FIELD

The present invention relates to float controlled valve assemblies which include at least one valve means installed into a liquid flow in a pipeline or a pipeline armature, and a liquid receptacle that is fed with at least a part of a liquid flowing, through the valve means or escaping, as a result of a sealing failure, from a liquid supply system including said at least one valve means. The valve assembly further includes at least one balance float connected to a rotatable free end of a pivoted balance lever. The at least one balance float stays at a hither position above or with respect to the liquid level of the liquid in the receptacle while sad liquid level is below a pre-determined or permitted level, and the balance float stays at a lower position with respect to the liquid level of and immerses, at least partially, into the liquid contained in the receptacle when said liquid level reaches or exceeds said pre-determined or permitted level in the liquid receptacle. The valve means of the valve assembly comprises a flow passage determined by a valve seat that is arranged between a pressure chamber and an outlet chamber of the valve means. The valve means also comprises a piston-like- closure member having, a valve shaft and a piston head at one end of the valve shaft. The valve shaft is slideably guided between a first end position and a second end position. The closure member maintains a thoroughfare flow passage through the valve means in the first end position of the valve shaft, and the closure member closes the flow passage through the valve means when the valve shaft is moved to its other, second end position The piston head of the closure member is arranged within the pressure chamber of the valve means, and the valve assembly further includes a mechanism arranged between the balance lever and the valve shaft of the closure member of the valve means.

BACKGROUND ART

It is a common characteristic of most hitherto known float controlled valve assemblies used for monitoring and influencing the liquid level of receptacles that a flow passage of a valve means is altered by a displaceable closure member. The closure member is generally movable between two end positions associated with an open and a closed state of the valve means, respectively. Such known valve assemblies also have a definite mechanical linkage between the float and the closure member of the valve means which is moved, at least in certain phases of the changes in the liquid level of the receptacle, by the float. A known valve assembly of the kind indicated is described for example in U.S. Pat. No. 5,072,751, where a float is secured to the end of a longer arm of a single-arm lever capable of tilting around a fulcrum secured to a valve housing, and the closure member of the valve is assigned to the end of a shorter arm of the single-arm lever in a way that an upper end of the closure member is permanently pressed by the pressure of water flowing across the valve against the lever while said lever is driven between its two end positions by the float in both directions. As a result of this, during filling up or refilling the receptacle after discharge, the movement of the closure member in the closing direction of the valve slows down gradually and proportionally to the gradually slowing rate of the rise of the float. Thus, the time period needed for filling or refilling the receptacle is extremely long, and the closure member of the valve narrowing the flow passage of the valve gradually over such long periods of time, as well as the co-acting valve seat are subject to rapid wear. This is an inherent and major disadvantage of the type of known valve assemblies referred to and dealt with e.g. in U.S. Pat. No. 5,072,751.

Patent specifications EP-A-768487, EP-A-709607, U.S. Pat. No. 5,230,361, FR-A-1223714 and GB-A-2067271 disclose float controlled valve assemblies in which a spring mechanism between a pivoted balance lever and a closure member of a valve means provides for self-locked states of the balance lever and thus, said closure member of the valve means in both a first and a second end position of said closure member corresponding to a closed and a thoroughfare state of the valve, respectively. In addition to this, the mechanism has a snap-action function in both directions of movement between said first and second end position for quick opening/closing of the valve. In these known prior art approaches however, for initiating the snap-action of the mechanism in both directions, the respective self-locked states of its end positions must be overcome by exerting a definite torque load, acting on the balance lever in the one sense of rotation in the first end position and acting on said balance lever again, in the opposite sense of rotation in the second end position of the closure member of the valve. Consequently, the balance float(s) of the valve assembly must be connected-to the balance lever of the valve via a rigid linking member e.g. a rod which must be capable of bearing and transmitting both, tensile and compressing load. This characteristic feature of the known valve assemblies of self-locking and snap-action function involves the disadvantage that due to the necessity of maintaining a rigid linkage between the balance float(s) and the balance lever of the assembly, the valve means cannot be located at any remote or distant location from the receptacle, it must rather be arranged within or at least in the nearest proximity of the liquid receptacle. Thus, with the known valve assemblies cited and listed further above, a "remote control" of the liquid level of receptacles can not be performed without using known additional means of signal and/or power transmission.

SUMMARY OF THE INVENTION

One object of the present invention is to provide a float controlled valve assembly, in which the rate of the closing and opening displacement of a closure member of the valve is not subject in any of the two directions, to the rate of the movement of the float, and which is, by appropriate dimensioning, suitable for both, the float controlled closing and re-opening of the valve.

Another objective of the present invention is the provision of a float controlled valve assembly, which enables the actuation of valves of large flow passages, even of valves of industrial sizes, by at least one relatively low weight float, whereby the valve assembly can also be used in industrial applications for automatically controlling the liquid level in all kinds of receptacles.

A yet another object of the present invention is to provide a valve assembly which also allows for a float controlled operation of valves that are located distantly from the liquid receptacle and thus, from the float associated therewith.

Finally, a further object of the invention lies in the provision of a float controlled valve assembly suitable for monitoring liquid, especially water supply systems of rooms, buildings, industrial plants and workshops, and for automatically closing the liquid, especially water supply when a leakage of the liquid or flooding resulting from pipe breakage or another sealing failure is detected.

In accordance with the above and other objects, the valve assembly of the present invention and having the characteristic features listed and described in the introductory part of the present description is characterised by a novel mechanism that is designed so as to having and staying in an at least approximately self-locked state when the valve shaft of the closure member of the valve means of the valve assembly stays in its first end position, the at least approximately self-locked state of the mechanism being substantially resistant to forces exerted onto and biasing the valve shaft towards its second end position in the sense of closing the thoroughfare flow passage through the valve means but the at least approximately self-locked state of the mechanism being, in accordance with the spirit of the invention, released when said at least one balance float loosing, at least partially, its weight by immersing, at least partially, into the liquid contained in the receptacle and thus, the torque exerted on the balance lever by said at least one balance float being reduced. In the valve assembly of the invention the at least one balance float is linked to the rotatable free end of the balance lever by means of a flexible link suitable for bearing and transferring tensile load only, the at least one balance float can be arranged at any location relative to the at least one valve means, and it can be suspended above the liquid receptacle in adjustable relation thereto.

In preferred embodiments of the valve assembly the at least one balance float may have a density that is identical with or is higher than that of the liquid. The at least one balance float can be divided into several internal compartments or sections. The internal compartments or sections of the at least one balance float can be made of or filled in with different structural materials of different density.

The mechanism may also include an energy-storing spring means, preferably at least one pre-tensioned compression spring biasing the closure member of the valve means in the direction of its second end position corresponding to the closed state of said valve means. Several balance floats arranged optionally on and held by the same link can be positioned at adjustable distances in relation to both, each other and the receptacle.

BRIEF DESCRIPTION OF THE DRAWINGS

Other features and advantages of the valve assembly according to the present invention will become apparent in the following detailed description of preferred embodiments with reference to the accompanying drawings, of which FIGS. 8A to 10B illustrate, partly in sectional views, preferred examples of embodiments of the valve assembly of the invention, which can be mounted into a delivery duct or also on the outlet (discharge) orifice of various water taps, where FIGS. *A again, show the open, flow-through condition of the valve means, while FIGS*. B depict the valve means in its closed state.

MODES FOR CARRYING OUT THE INVENTION

Figure 1A:
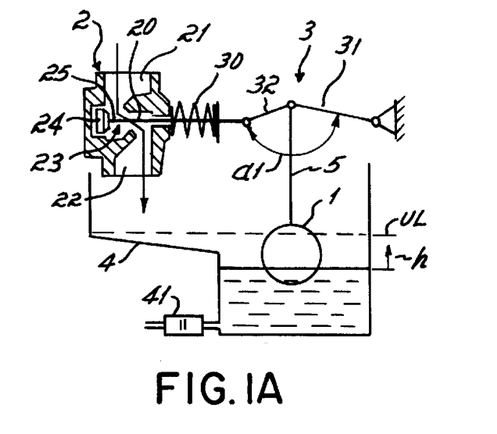
FIGS. 1A and 1B are sketches showing in the open and closed positions of the valve means, respectively, the schematic design and mode of operation of a first embodiment of the invention in which a valve means is controlled by a suspended single balance float.
Figure 1B:
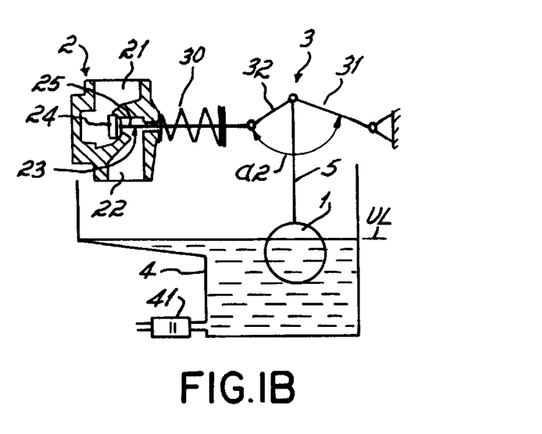

A first embodiment of the valve assembly according to the invention shown, by way of example only, in open and closed valve means positions in the schematic diagrams of FIGS. 1A and 1B, respectively, includes a valve means 2 mounted into the pipeline or pipeline armature (not shown in the drawing). The valve assembly further includes a liquid receptacle 4 supplied by liquid flowing through the valve means 2 in its open valve position, and a balance float 1 which is connected via a flexible link 5 to a rotatable free end of a pivoted balance lever 31. The balance float 1 is to a greater part immersed into a liquid contained in the liquid receptacle 4 when its liquid level has reached a pre-determined or permitted upper UL liquid level (FIG. 1B). Otherwise, the balance float 1 stays to a greater part above the current liquid level of the liquid receptacle 4 while the liquid level is lower than pre-determined or permitted (FIG. 1A). Between a pressure chamber 21 and an outlet chamber 22 of the valve means 2 there is flow passage 20 determined by a valve seat, and the flow passage 20 is sealingly closeable by a piston head 24 of a piston-like closure member 23, a valve shaft 25 of which is slideably guided and thus, the piston head is movable between two end positions. In its first end position the valve head 24 keeps open the flow passage 20 of the valve means whereby the flow of liquid through the latter is allowed. The piston head 24 seals the flow passage 20 of valve means 2 in its other, second end position whereby the flow of the liquid through valve means 2 is blocked. The piston head 24 of the piston-like closure member 23 is located in the pressure chamber 21 of the valve means 2. Between the balance lever 31 and the valve shaft 25 there is an actuating mechanism 3 which is, when the piston-like closure member 23 is in its first, open valve end position (FIG. 1A) in an at least approximately self-locked state in which the mechanism 3 is substantially resistant to forces exerted onto and biassing the valve shaft 25 towards its second end position in the sense of closing the thoroughfare flow passage through the valve means 2. The joint forces acting on the closure member 23 result from the (differential) pressure of the liquid acting on piston head 24 and the force of a pre-tensioned and energy storing compression spring 30. As a result of the design and dimensioning of the component parts of mechanism 3, in such a substantially self-locked state, an angle α1 between a coupling link 32 and the balance lever 31 of mechanism 3 is almost 180°, consequently the above mentioned components of the mechanism 3 are almost aligned. This self-locked state of the mechanism 3 can be easily and steadily maintained by a very low torque load acting on the balance lever 31 even by a low weight balance float 1 staying, at least partially, above the pre-determined liquid level of the liquid receptacle 4. Consequently, if the liquid in the receptacle 4 does not reach or exceed the upper liquid level UL specified or permitted by the (alterable) suspension height of the balance float 1, the valve means 2 remains steadily in the open valve position shown in FIG. 1A. The at least approximately self-locked state of the mechanism 3 is, however, easily releasable when the torque exerted onto the balance lever 31 by the weight of the balance float 1 is slightly reduced, and the balance lever 31 is lifted and turned in a direction opposite to the torque exerted thereon by balance float 1. Thus, when the liquid level in the liquid receptacle 4 rises as shown by arrow h in FIG. 1A, the balance float 1 which preferably has a density not significantly differing from that of the liquid, is gradually immersed into the liquid, and as a result of the buoyant force, its weight decreases slightly. Consequently, the torque loading the balance lever 31 is also reduced. As a result of the design and dimensioning of mechanism 3, even when this torque is reduced very slightly, this slight decrease of torque is sufficient to release the self-locked state of the mechanism 3 shown in FIG. 1A, by virtue of which the joint hinging point of balance lever 31 and coupling link 32 is moved upwards, angle α1 starts to decrease rapidly, and the force acting against the joint force of the liquid pressure acting on piston head 25 of the closure member 23 and the energy stored in compression spring 30 decreases dramatically. As a result of this, the piston-like closure member 23 virtually jumps with an accelerating motion into its other, second end position, and the piston head 24 closes the flow passage 20 of valve means 2, as shown in FIG. 1B. The closed valve state is steadily maintained by the liquid pressure acting on the total surface of piston head 24 compensating the force decrease in compression spring 30 which has occured as a result of the displacement, while the mechanism 3 is practically released from load. After a very slight displacement of the balance lever 31, which releases the self-locked state of the mechanism 3, the speed of the remaining valve closing motion does no more depend on the weight of balance float 1 and thank to the design of mechanism 3, the valve assembly embodying the invention is suitable to actuate almost any, even industrial size valve means 2 of considerable flow passage 20 by using a low weight and small size balance float 1. The embodiments of the valve assembly of the invention shown in FIGS. 1A and 1B, are generally designed and dimensioned so that the increasing torque acting on balance lever 31 through the weight of the preferably low weight balance float 1 in the way already mentioned when the buoyant force no longer acts on balance float 1, cannot reset the valve means 2 to its open position without external intervention, even when the liquid level decreases in liquid receptacle 4. The main field of application of such valve assemblies is generally the water-saving operation of any type of liquid receptacle 4 generally, including but not limited to bath tubs, basins (pools) etc., by making sure that the valve assembly embodying the invention and associated with the valve battery/water tap filling the same closes the flow of water when a pre-determined water level in the receptacle is reached, even if the filling tap is left open accidentally. Once the tendency to overflow has been detected, the closure member 23 of valve means 2 of the valve assembly that has been moved into its closed position by the balance float 1 automatically, can be reset to its open valve position shown in FIG. 1A for example by pulling the flexible link 5 (chain, cord etc.) or by turning the balance lever 31 or an associated auxiliary lever (not shown) manually, following which the filling tap left open can also be turned off.

Figure 2A:
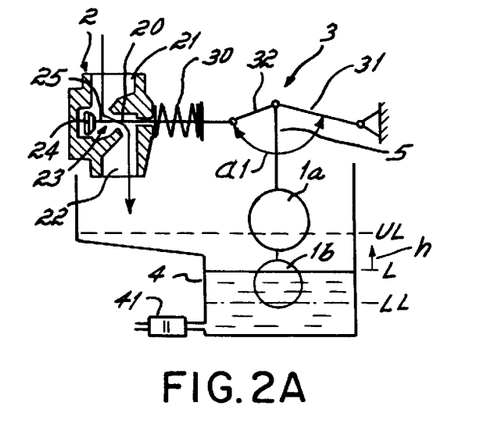
FIGS. 2A and 2B are simplified sketches of another preferred embodiment wherein a valve means is controlled by two balance floats hanging on the same link, and wherein the valve assembly is shown again in the open and closed positions of the valve means, respectively.
Figure 2B:
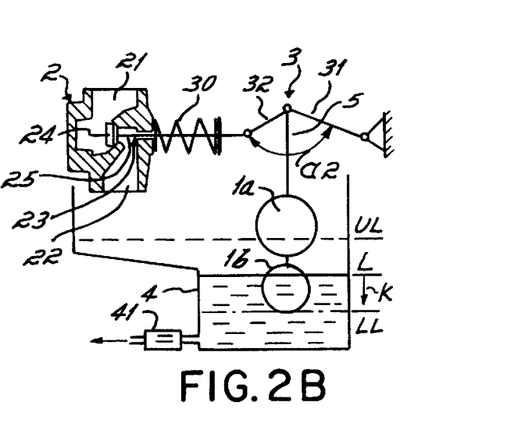

In FIGS. 2A and 2B of the drawing, only as an example, another embodiment of the valve assembly of the invention and described above is shown, which includes two balance floats 1a and 1b arranged on the same flexible link 5 one below the other in alterable and adjustable heights relative to both, the liquid receptacle 4 and each other. Subject to appropriate dimensioning, the balance floats 1a and 1b of this embodiment of the invention are suitable for controlled actuating the mechanism 3, and thereby the piston-like closure member 23 of valve means 2, in both directions. Thus, the liquid volume in the liquid receptacle 4 is maintained even without manual intervention, between two pre-determined liquid levels, as indicated in the drawing figures by upper level UL and lower level LL. To this end, it has been proved to be appropriate to choose the density of the material of the lower balance float 1b to be nearly identical with that of the liquid. When after immersion, balance float 1b is floating in the liquid, it would not influence the torque acting on the balance lever 31. The density of the upper balance float 1 a can be lower than that of the liquid. When it is immersed even slightly, it starts to float by rapidly losing the force of gravity, whereby the switching hysteresis of the valve assembly can be kept conveniently low. In the state of operation depicted in FIG. 2B, a lower outlet valve 41 of the liquid receptacle 4 is closed, valve means 2 is in the open position, and the liquid level in the liquid receptacle 4 rises as indicated by arrow h. The lower balance float 1b floating in the liquid does not have any effect on the system, and the upper balance float 1a acts on the balance lever 31 with its total weight. When the liquid in the receptacle 4 reaches the upper level UL, the balance float 1a is floating and loses its weight, and as already described above with reference to drawing FIGS. 1A and 1B, the rapid closing of valve means 2 takes place, and the liquid level stoppes to rise further. If outlet valve 41 is opened, the liquid level in liquid receptacle 4 starts to decrease, as shown by arrow k in FIG. 2B. In a way already mentioned above, the upper balance float 1A gradually leaves the liquid, and it regains its weight. Its additional torque however, is not yet sufficient to reset the piston-like closure member 23 of the valve means 2 by the compression spring 30 against liquid pressure acting on piston head 24 to its first end position corresponding to the open valve status. In the course of the further reduction of the liquid level however, also the lower (and heavier) balance float 1b gradually leaves the liquid, and its force of gravity is substantially regained when reaching the lower liquid level LL is, added to the weight of balansce float 1a. already sufficient enough to reset the open valve position of valve means 2 as shown in FIG. 2A. Hereafter, when outlet valve 41 is closed, or the flow of liquid escaping through the latter is smaller than that of the liquid flowing in receptacle 4 through valve means 2, the liquid level in the liquid receptacle 4 starts to rise again, and it gradually rises as long as it reaches the upper liquid level UL. Consequently, by using the valve assembly of the invention, an automatic level control between even extremely wide liquid level limits can be performed and maintained.

The link connecting the balance float(s) 1, 1a, 1b to the balance lever 31 is by no means an essential characteristic feature of the valve assembly of the invention. The use of any link 5 suitable for transferring load in both directions such as a rod, or a rigid coupling of at least one of the balance floats 1, 1a or 1b directly to the free end of a balance lever 31 immersible in the liquid receptacle 4, could be especially advantageous for designing valve assemblies capable of moving automatically and with high reliability the valve means 2 between its appropriate open and closed positions when pre-determined lower and upper liquid levels in the receptacle 4 are reached.

As mentioned already further above, balance floats 1, 1a, 1b having a density that is identical with or lower or higher than that of the liquid can also be used in the assembly. Balance floats 1, 1a, 1b of a density identical with that of the liquied can simply be filled even with the liquid itself. The balance floats 1, 1a, 1b can optionally be divided into several internal compartments or sections, and the internal compartments or sections of the balance float 1, 1a, 1b can be made of or filled in with different structural materials of different density. The balance floats of the assembly can also be designed so as to be of special shape and internal weight distribution. Such balance floats would change their weight as a function of their depth of immersion in a desired and specified way. By doing so, the change in the force of gravity of a balance float immersed into or rising from the liquid can be specified according to any desired programme. The internal weight distribution changing in a specified way can be implemented advantageously for example in a single float body having several internal compartments, with a structural material differing in each compartment or filled up with materials of different density in each compartment, as already mentioned further above. With reference to the embodiment shown in FIGS. 2A and 2B of the attached drawing, such balance floats may for example replace the two balance floats 1a and 1b of different density and weight by a single "combined float" of changing density in applications where only a slight and constant level difference is pre-determined or permitted between the upper and lower liquid levels UL and LL.

Figure 3A:
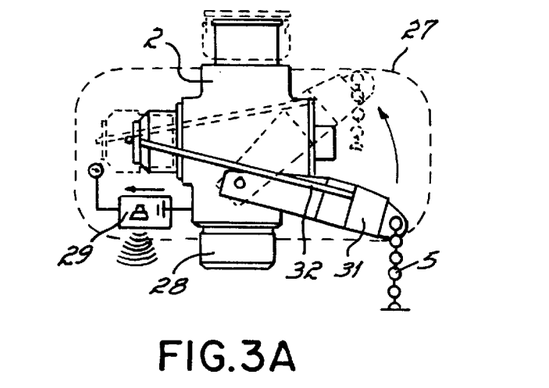
FIG. 3A is a front view of the valve means of another embodiment of the invention which can be fitted to replace a flow strainer of a bath tub valve battery or any other water tap in order to prevent the overflow of a bath tub, hand-wash basin, pool or any other liquid receptacle.
Figure 3B:
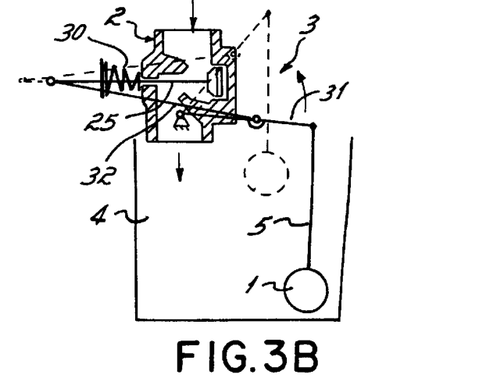
FIG. 3B is a simplified sketch depicting the schematic internal design and mode of operation of the embodiment shown in FIG. 3A, FIGS. 4A to 7B are, by way of examples only, schematic kinematic sketches of preferred mechanisms of the valve assembly of the invention, where in FIGS. *A the valve means is shown in its open state, while FIGS. *B depict the valve means of the assembly in its closed state.

In FIG. 3A a particular preferred embodiment of the valve means of the invention is shown which can be preferably mounted, replacing the flow strainer, onto the threaded discharge orifice of a valve battery or a different water tap in order to prevent the overflow of a bath tub, a hand-wash basin, a pool or any other liquid receptacle. As shown in the drawing figure, here the balance lever 31 is designed as a single-arm lever increasing the ratio of transmission, the fulcrum of which is arranged on a casing of valve means 2. The coupling link 32 is linked to the shorter arm section of the single-arm lever, while the balance float (not shown in the figure) is via a link 5 designed in the embodiment shown as a small-bead chain linked to the longer arm section of the single-arm lever at the free end of the balance lever 31. In the drawing figure, full lines show the positions of the above mentioned components of the mechanism 3 in the open valve state, while dotted lines depict their status in the closed valve position. The valve housing and most mechanism component parts of the valve assembly can be covered with an aesthetic casing 27 also shown with dotted lines in the drawing figure, and the original strainer 28 of the valve battery or any different type of water tap can be fitted to a threaded discharge stub of valve means 2. With commercially available embodiments of the valve assembly of the invention preferably an adapter set is supplied which enables its mounting to various existing standard taps and valve batteries. In the embodiment shown, the casing 27 of the valve assembly may also include sound signal device which provides an audible warning when the valve means 2 is switched to its closed position (when for example the bath tub is full). The internal conceptual design allowing to describe the mode of operation of the valve assembly embodying the invention shown in FIG. 3A is depicted in FIG. 3B, in which the valve means 2 is shown in its open state. The positions of coupling link 32 and balance lever 31 of the mechanism 3 and those of balance float 1 and flexible link 5 in this open valve state are shown by continuous, full lines, while the other positions of the structural elements listed (when the valve is closed) are depicted by dotted lines. The mode of operation of the valve assembly is exactly identical with that of the embodiment shown in FIGS. 1A and 1B, so its detailed description will not be repeated here.

Again by way of examples only, FIGS. 4A to 7B of the attached drawing show schematic kinematic sketches of various preferred mechanisms 3 suitable for the practical implementation of the valve assembly embodying the invention. FIGS. *A depict the open, thoroughfare state of the valve assembly, while FIGS. *B show the valve assembly in its other state when it blocks the flow of liquid. It can be seen in the drawing figures that angle $\alpha 1$ characteristic of the self-locked status of each mechanism 3 is considerably larger in the open thoroughfare status of the valve means 2 than angle $\alpha 2$ prevailing and shown in the figures illustrating the closed state of valve means 2. It seems to be of importance to note that though all examples shown include a compression spring 30, the valve assembly having an energy storing spring member is not an essential characteristic feature of the invention. Valve assemblies with a mechanism having no spring member can preferably be controlled and actuated by at least one balance float of the "combined" type referred to further above, which balance float is rigidly coupled to the free end of the balance lever, and has at least one inner compartment the density of which is lower than that of the liquid.

Figure 4A:
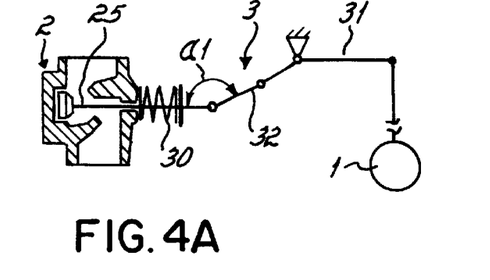
Figure 4B:
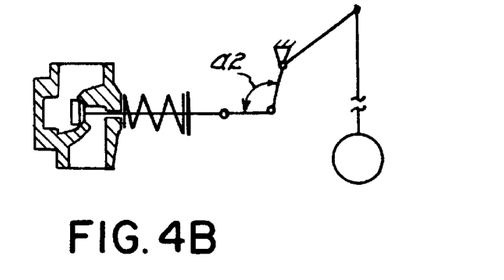
Figure 5A:
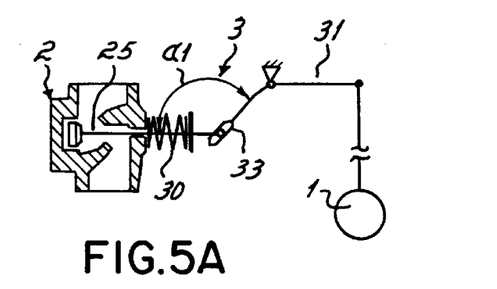
Figure 5B:
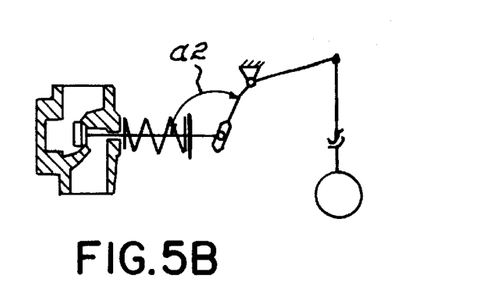
Figure 6A:
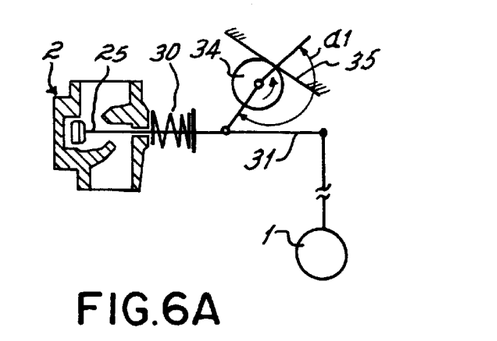
Figure 6B:
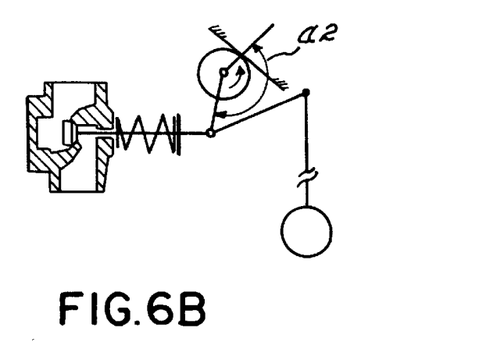
Figure 7A:
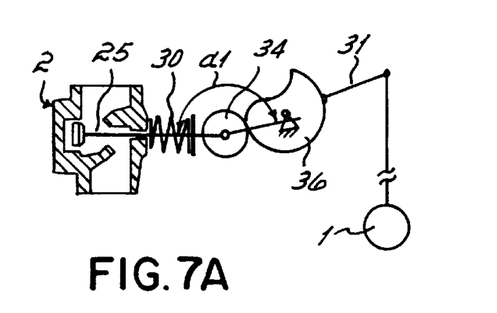
Figure 7B:
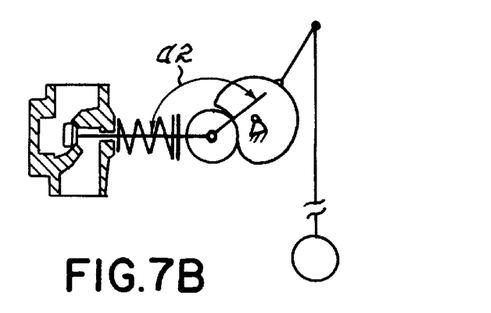
Figures 8A, 9A:
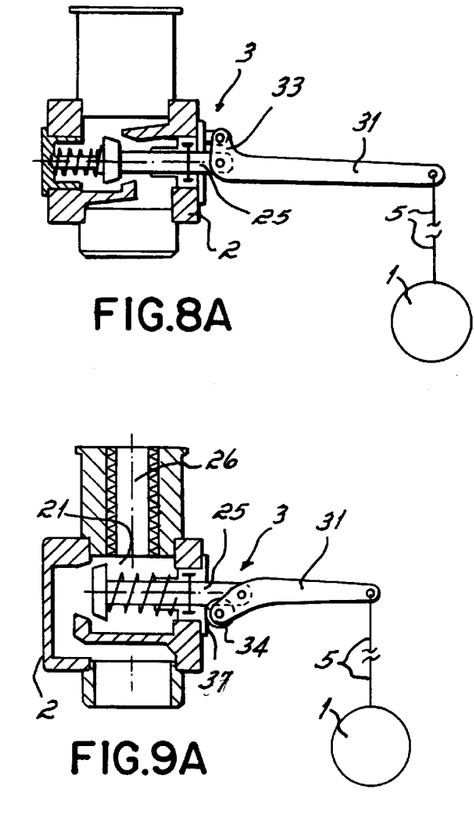
Figures 8B, 9B:
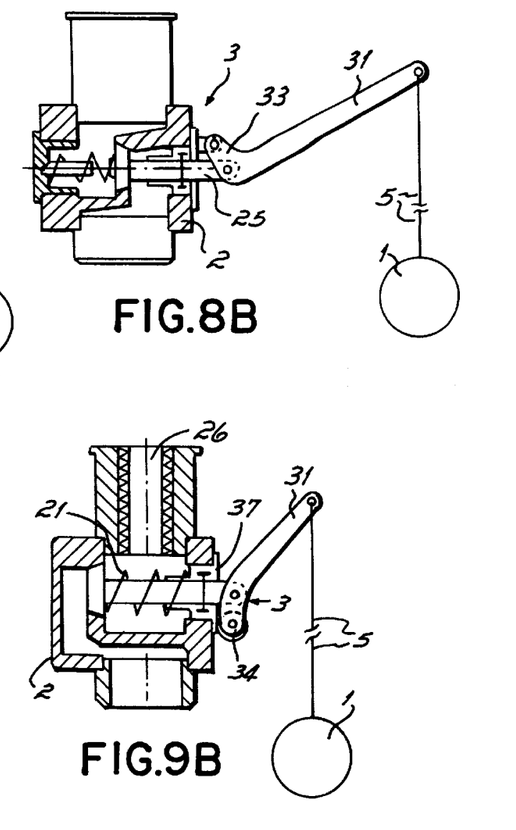

FIGS. 4A and 4B indicate a mechanism 3 having a coupling link 32 connected to an angled two-arm balance lever 31. The mechanism 3 shown in FIGS. 5A and 5B has an angled two-arm balance lever 31. One of its arms is designed as a slotted link bar 33 which is linked to a pin of the valve shaft 25 of valve means 2 whereby a relative slipping motion between the slotted link bar of the balance lever 31 and the valve shaft 25 is allowed for. The balance lever 31 of the mechanism 3 according to FIGS. 6A and 6B is again an angle lever, which is joined in a fulcrum to the valve shaft 25 of valve means 2. The balance float 1 is suspended from (or rigidly fixed to) the free end of one arm of the angle lever, while at the end of the other arm of the angle lever a roller 34 capable of freely rolling on a support surface 35 is arranged. It is noted here that the self-locked and release characteristics of such mechanisms 3 can be influenced and further improved by designing and using a support surface 35 of a shape other than a flat plane. The mechanism shown in FIGS. 7A and 7B includes a cam disc 36 connected rigidly to the balance lever 31 and co-acting with a roller 34 arranged, freely rotatably again, on the valve shaft 25 of the valve means 2. In addition to those shown in the drawing figures, also other types of well known mechanisms can be properly designed and used for valve assemblies of the invention.

Figure 10A:
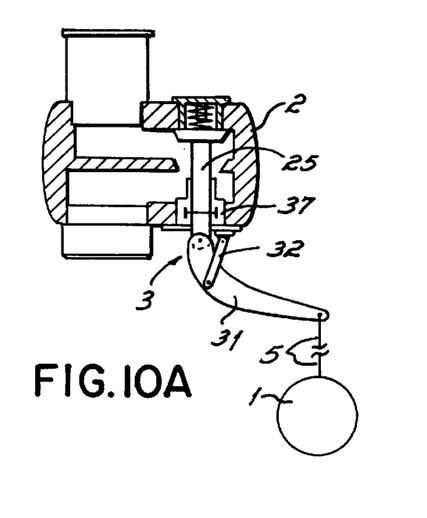
Figure 10B:
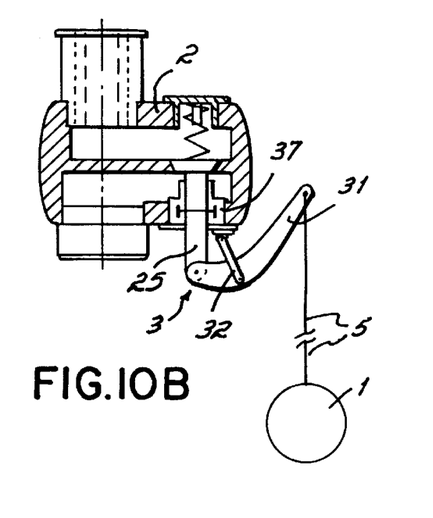

FIGS. 8A to 10B show preferred implementation examples of the valve assembly embodying the invention. The embodiments shown can be installed into a delivery duct, and can also be attached to the discharge orifice of various water taps. Again, FIGS. *A show the open thoroughfare state of valve means 2 of the valve assembly, while FIGS. *B depict the valve means 2 in its closed state of operation. The mechanism 3 of the valve assembly shown in FIGS. 8A and 8B makes use of the design shown and described conceptually earlier with reference to FIGS. 5A and 5B. The valve assembly shown in FIGS. 9A and 9B includes one version of the support roller mechanism 3 depicted in FIGS. 6A and 6B, while the mechanism 3 of the valve assembly shown in FIGS. 10A and 10B is a suitably adapted version of a mechanism using a coupling link 32. Concerning the valve assembly shown in FIGS. 9A and 9B it should be noted that if a bushing 37 guiding in a sealed way, the valve shaft 25 of the valve means 2 is fitted into the casing of valve means 2 in a way that the fit allows for the rotation of the bushing 37 around the centreline of the valve shaft 27, and the axial fixing of the bushing 37 in the valve housing is provided for, the balance lever 31 can be rotated, together with the link 5 secured to its end and with the balance float 1 arranged on the link 5, around the centreline of the valve shaft 25. Thus, the balance lever 31 and the component parts attached thereto can always be adjusted to a position which is the most comfortable and ensures the least interference in use. If the support roller mechanism 3 shown in FIGS. 9A and 9B is used for a vertically installed valve assembly, the same effect can be accomplished even by using a fixed and stationary bushing 37.

If as it will be dealt with later, a valve assembly according to the invention is connected to or installed in the discharge orifice of a liquid valve or tap, in the simultaneously closed position of the valve means 2 of the valve assembly and with the liquid valve or tap directly fitted upstream of the pressure chamber 21 of the valve 21, the pressure chamber 21 of the valve means 2 is filled up with a liquid volume theoretically incompressible, which prevents but at least makes it difficult for the piston head 24 of the valve means 2 to be displaced against the liquid pressure, whereby the opening of the valve means 2 is prevented or at least constrained. For eliminating this phenomenon, it has proven to be advantageous to arrange a deformable structural element of capable of elastic deformation, preferably a lining or a sleeve 26 in or near to the pressure chamber 21 of the valve 2, or elsewhere in the space filled up with the enclosed liquid, for example in a directly linked delivery duct section or armature element, as shown clearly in FIGS. 9A and 9B of the attached drawing. The elastic deformable, especially compressible sleeve 26 enables a slight increase of the volume of the enclosed space, thereby facilitating the initial (opening) displacement of the piston head 24 of the valve means 2. In addition, the sleeve 26 of elastic deformation also reduces and virtually eliminates the operating noise of valve means, 2.

Figure 11A:
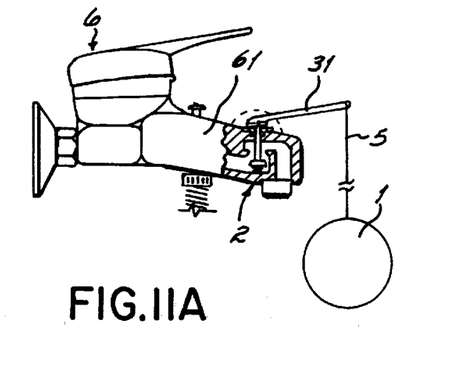
FIGS. 11A and 11B are partly sectional views of an embodiment mounted into the valve battery of a bath tub. The figs. show again the valve means in its states of passing through and blocking the flow of water, respectively.
Figure 11B:
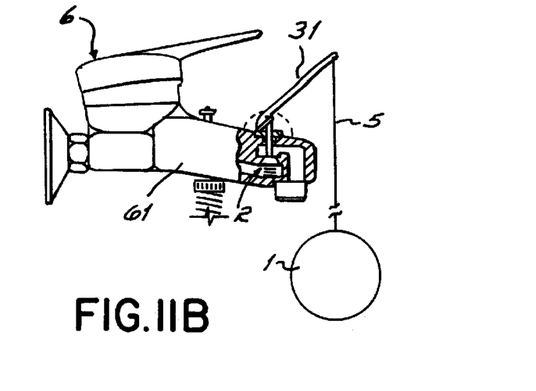
Figure 12:
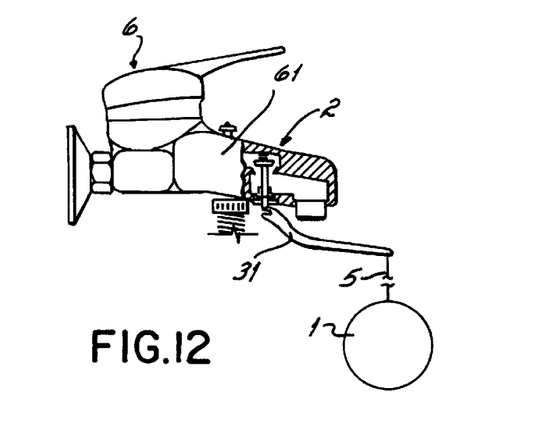
FIGS. 12 and 13 show further implementation examples which can be installed, preferably, in a bathroom valve battery.
Figure 13:
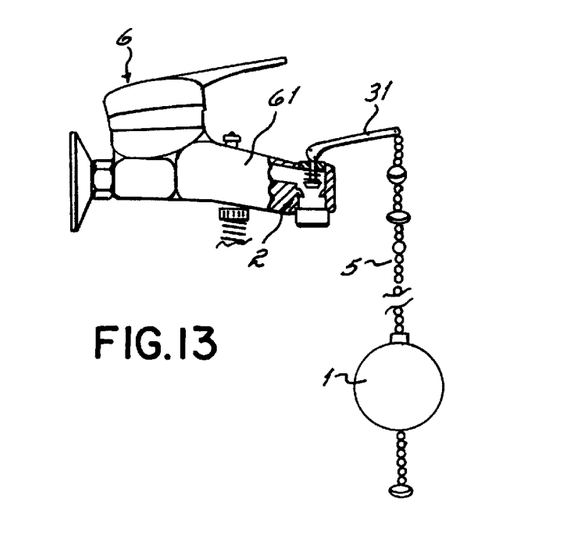

FIGS. 11A to 13 show some further preferred embodiments of the valve assembly of the invention installed in an integrated way into a valve battery 6 of a bath tub, by way of example only. FIGS. 11A and 11B show the same embodiment of the valve assembly in its open and closed valve state, respectively. The mechanism 3 of the embodiment shown has a balance lever 31 designed as a slotted link bar. FIG. 12 shows another possible arrangement of the actuating lever 31 in respect to the discharge orifice 61 of the valve battery 6, and FIG. 13 indicates an upper arrangement of a support roller actuating lever 31 version in an open valve position. As already referred to earlier, the actuating lever 31 of the embodiment shown in FIG. 13 can be almost fully turned round the valve shaft axis which is vertical in this case, whereby it can be set to suitable operating positions. As further shown in FIG. 13, the link 5 of the balance float 1 can be a chain of aesthetic finish consisting of small beads, which can optionally be associated with coloured plastic chain links for easier handling, for indicating the actual valve position, and for extending the chain.

Figure 14:
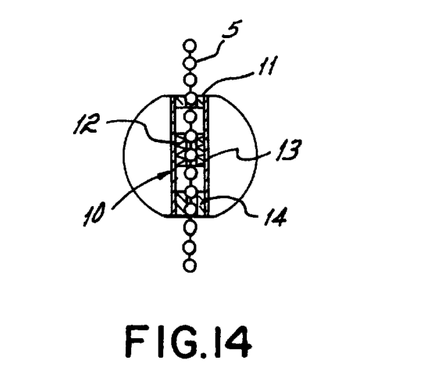
FIG. 14 is a longitudinal sectional view of a float mount example suitable for holding a balance float on a flexible link in an adjustable manner.

FIG. 14 shows an adjustable float mount 10 ensuring, in a simple way, the adjustment and position-keeping of the balance float 1 on the link 5 designed as a bead chain as described further above. The float mount 10 includes a rubber sleeve 12 arranged in a housing pipe 13, which is embedded with tight fit, into the balance float 1. An inner bore of the rubber sleeve 12 capable of elastic deformation surrounds the beads of the chain tightly. At its top, the housing pipe 13 is sealed by a fitting plug 11 having a central bore for the chain, and the housing pipe 13 has a threaded bottom closure 14 at its bottom. The bore in the rubber sleeve 12 is selected in a way that by applying a certain force it enables the displacement of the balance float 1 on the bead chain, and thereby the adjustment and readjustment of the appropriate height position of the balance float relative thereto. The float mount 10 can also be designed in a way that a rubber sleeve 12 filling the complete inner length of the housing pipe 13 is used. In such embodiments, the clamping force exerted by the rubber sleeve 12 onto the chain can be increased or adjusted to the desirable rate by tightening the threaded bottom closure 14, resulting in a longitudinal compression of the rubber sleeve 12.

Figure 15:
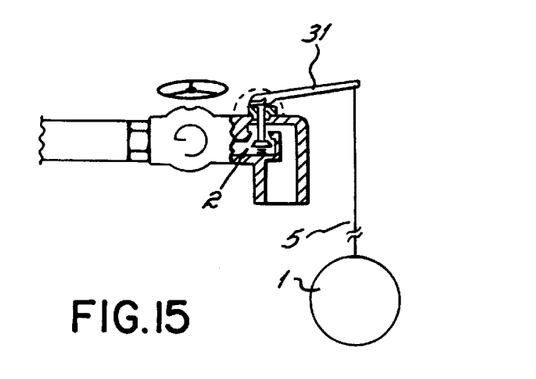
FIG. 15 is the side view of a water tap which includes an embodiment of the valve assembly embodying the invention.

FIG. 15 shows another implementation example of the valve assembly embodying the invention, in which the valve means 2 is built in in a common water tap.

Figure 16:
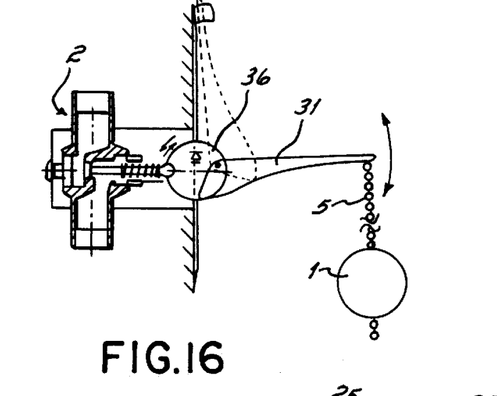
FIG. 16 is the sectional view of a further implementation example using a valve means mouted and located behind the wall plane.

FIG. 16 shows as a further example, the sectional view of a valve assembly of the invention, wherein the valve means 2 is installed behind a wall plane. This embodiment includes a cam disc mechanism 3 similar to shown earlier as a schematic kinematic diagram in FIGS. 7A and 7B. Here, the cam disc 36 and the actuating lever 31 are designed so that in the lever position shown by a continuous line in the drawind figure they move together, but in the preferentially open position of the valve means 2, the lever 31 can be brought into a vertical position (shown in dotted line in the figure) by tilting around a fulcrum in the disc without actuating the cam disc 36. In such a state of operation, the valve assembly is temporarily out of use in the open position of valve 2.

Figure 17:
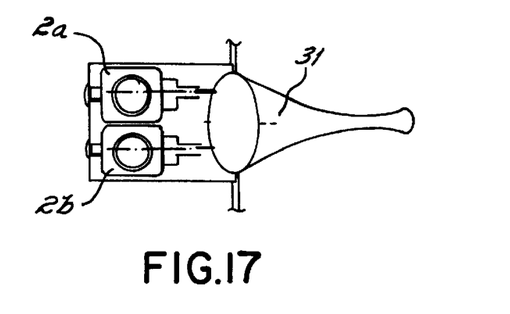
FIG. 17 is a top view of another valve assembly illustrating the a possibility of operating two valve means by a single balance lever.
Figure 18:
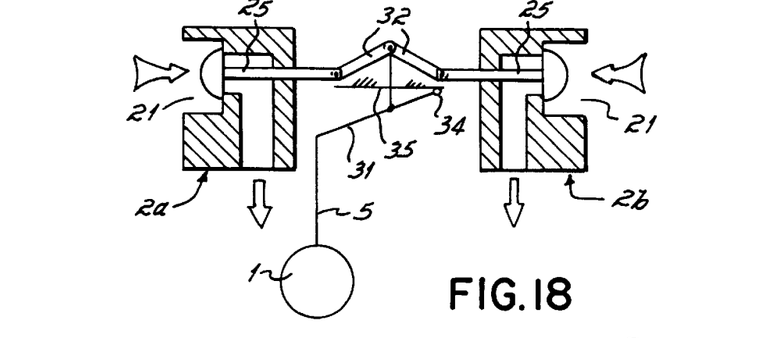
FIG. 18 is a simplified sketch of a valve assembly example embodying the invention, wherein two valve means are again, controlled by a single balance lever.

FIG. 17 shows, by way of example only, a suitable design for simultaneously controlling two (or even more) valves 2a, 2b by a single balance lever 31 and by a balance float (not shown) associated therewith. A further example of simultaneously controlling two valves 2a, 2b by a single balance lever 31 and a balance float 1 associated therewith, is shown in FIG. 18. The mechanism 3 used in this embodiment is similar to that described already with reference to FIGS. 6A and 6B further above. Here however, the balance float 1 is connected to the free end of a balance lever 31 which is, at its other end, equipped with a roller 34 capable of rolling on a support surface 35. The changing weight of the balance fload acts on a common point of two coupling links 32. Such embodiments of the valve assembly of the invention can preferably be associated with so called mixing valve batteries having saparate inlets for cold and warm water, respectively, and the unit comprising the simultaneously controlled two valve means 2 can, because of its relatively slim design, easily be mounted in bath rooms, kitchens and the like between the wall plane and the inlets of mixing valve battery.

Figure 19A:
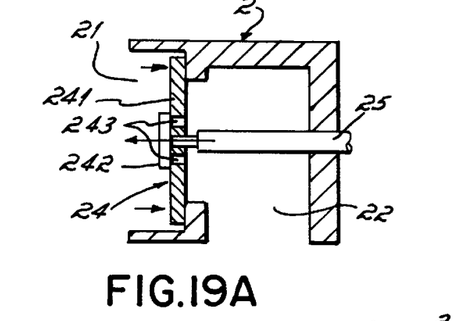
FIGS. 19A to 19C are sketches showing in different (closed, intermediate and opened) states of operation of a piston head of the piston-like closure member of a valve assembly, in which the valve means is suitable for implementing a multi-stage valve opening. This embodiment can be used beneficially especially in valve means of valve assemblies of the invention, by which a large size flow passage is controlled at high pressure, mainly in industrial applications.
Figure 19B:
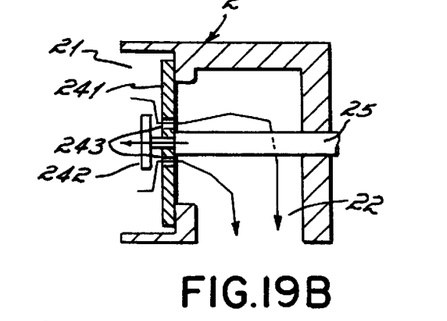
Figure 19C:
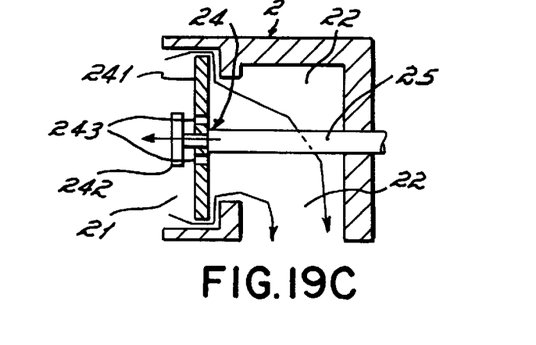

It has already been mentioned that thanks to the design and the mode of operation of the valve assembly embodying the invention, even high pressure valves with large flow passages as used in industrial applications can be controlled by at least one balance float of small weight and light design. The piston heads 24 used in such valves means 2 generally have a large surface and work against a significant liquid pressure. Preferred embodiments of such piston heads 24 are of the multi-disc structure whereby a gradual opening of the valve means 2 is provided for. A sectional view of an example for such a multi-disc piston head 24 is shown as an elevation, in FIGS. 19A to 19C of the attached drawing. Here, the piston head 24 of the valve means 2 consists of two associated discs 241 and 242 of different diameters. Close to its periphery, disc 241 of larger diameter is shaped so as to being suitable for sealingly engaging the valve seat and thus, preventing the liquid from flowing through the valve means 2. The smaller diameter disc 242 located towards the pressure chamber 21 of the valve means 2 is fixed rigidly to the valve shaft 25, while the larger disc 241 is slideably fitted on the valve shaft 25, the fit allowing a limited axial displacement of disc 241 along valve shaft 25. The smaller disc 242 fixed onto the valve shaft 25 has no holes, while the larger disc 241 fitted in a displaceable way on valve shaft 25 has preferably two or more openings 253 in a range within the diameter of the smaller disc 242. FIG. 19A depicts the operational state of the two-disc piston head 24 in its valve closing end position. In this state, the liquid pressure present in the pressure chamber 21 of the valve means 2 maintains the larger disc 241 being pressed against the valve seat, and the smaller disc 242 is pressed against the larger disc 241. The larger disc 241 keeps the flow passage determined by the valve seat of valve means 2 in its sealingly closed state, and the smaller disc 242 keeps the openings 243 of the larger disc 242 closed. The initial phase of valve opening is shown in FIG. 19B. Valve shaft 25 has been slightly displaced to the left, and the openings 243 of disc 241 have been opened so that the liquid is allowed to flow from the pressure chamber 21 into the outlet chamber 22 of the valve means 2, whereby the pressure difference between the valve chambers 21 and 22 is reducing. For the initial displacing the valve shaft 25, that is for initiating the valve opening, only the smaller force generated by the liquid pressure and acting on the smaller surface of piston 242 has to be overcome. As soon as the pressure difference between valve chambers 21 and 22 is nearing and reaches practically at zero, the valve shaft 25 is moved further whereby the larger disc 241 is removed from the valve seat, the total flow passage of the valve means 2 is opened up and the valve means 2 is moved to its open valve position shown in FIG. 19C. In addition to the design using two discs 241, 242 shown as an example only in the drawing and described above, multi-disc embodiments of the piston head 24 may also be used.

Figure 20:
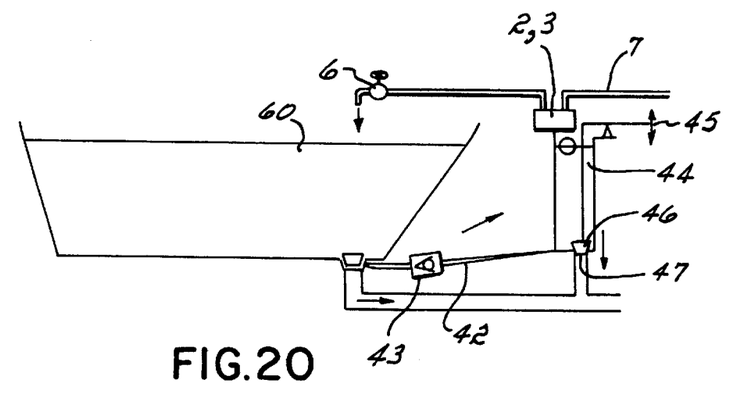
FIG. 20 is a sketch illustrating, as an example only, the schematic structure of a valve assembly of the invention, which can be installed in a concealed, hidden way behind the wall plane, and which allows for filling additional amounts of liquid in a receptacle, especially bath tub.

Practical experience has shown that when the valve assembly embodying the invention is applied for preventing the overflow of bath tubs, it may be desirable to add a smaller volume of liquid e.g. hot water to the water content of the tub which has already reached the specified, predetermined liquid level but cooled off in the meantime or was found insufficiently hot. The implementation examples described would not allow this, because the balance float 1 which has lost its weight by being immersed into the water would, without reducing the water level, not allow for the resetting of the valve means 2 of the valve assembly to its open position. In addition to other advantages, a replenishing at unchanged water level is enabled by making use of a further preferred embodiment of the valve assembly of the invention, as shown in FIG. 20. In this embodiment, valve means 2 and mechanism 3 of the valve assembly are fitted upstream of the valve battery 6 of a bath tub 60 protected against overflow. By means of a bottom connecting pipe 42 utilising the principle of communicating vessels, the liquid content of the bath tub 60 is in communicating connection with an auxiliary receptacle 44, the cross-sectional area and the volume of which are much smaller than that of the bath tub 60. In its bottom range, the auxiliary receptacle 44 has a discharge orifice 47 closed by a valve 46, which can be opened by activating a release lever 45 manually. For reasons of higieny, the bottom connecting pipe 42 includes check valve 43 which excludes the possibility of water flowing back from the auxiliary receptacle 44 into the bath tub 60. The internal cross section of the connecting pipe 42 is much smaller than the cross section of the discharge opening 47, and the balance float 1 is arranged above the auxiliary receptacle 44 whereby the balance float 1 controls the liquid level in the bath tub 60 by immersing in the liquid contained in the auxiliary receptacle 44 while the bath tub is being filled with water flowing through the valve means 2 in its open state. In this embodiment a further significant advantage is seen in that the valve assembly embodying the invention is fully hidden, i.e. concealed because the auxiliary receptacle 44 and the accessories associated therewith can all be arranged behind the wall plane. Practically, only the valve battery 6 and an end portion of the release lever 45 are exposed in the bathroom. The mode of operation of the embodiment of the invention shown in FIG. 20 is the following:

During the relatively slow filling of the bath tub 60, the auxiliary tank 44 is also filled up to an identical level through the narrow cross section connecting pipe 42. When the pre-determind water level is reached, the balance float 1 immersing into the water in auxiliary receptacle 44 looses its weight, the valve assembly according to the invention is actuated, and the water flow from the delivery duct 7 to the valve battery 6 becomes blocked by valve means 2. If it is desired to fill a further volume of water into bath tub 60, the valve 46 is opened by actuating the release lever 45 and the water is rapidly released from the auxiliary receptacle 44 through the discharge opening 47 of large cross section. The water level in the auxiliary receptacle 44 quickly decreases because due to the difference in cross sections, it can only be filled up slowly via connecting pipe 42. As a result of the rapid reduction of the water level in the auxiliary receptacle 44, the balance float 1 leaves the liquid, and by regaining its weight, it resets, at least temporary, the valve means 2 of the valve assembly into its open state, whereby an additional amount of preferably hot water is allowed to flow into the bath tub 60 through valve means 2. By stopping the actuation of the release lever 45 the valve 46 of the auxiliary receptacle 44 is closed, and latter is relatively slowly refilled up to the water level of the bath tub 60 through the narrow connecting pipe 42. The balance float 1 is immersed into water again, and by means of the associated mechanism 3, it moves the valve means 2 into its closed valve state again.

Figure 21:
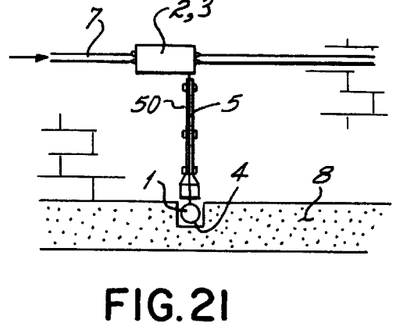
FIG. 21 is a sketch depicting one preferred field of application, by way of example only, of the valve assembly of the invention in which the invention is used as "flood guard" for preventing the flooding of buildings/premises.
Figure 22:
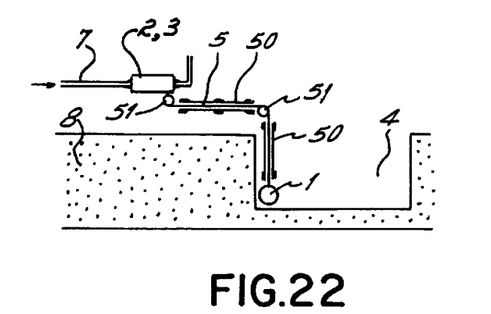
FIG. 22 illustrates a different example of the installation of the "flood guard" shown in FIG. 21
Figure 23:
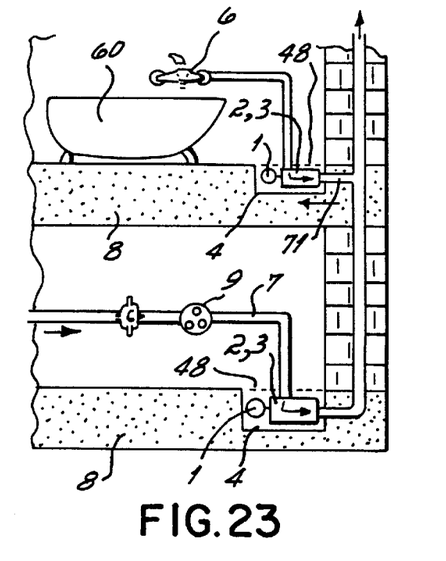
FIG. 23 depicts an implementation example showing installation possibilities of another embodiment of the invention as a "flood guard" again, by which a liquid, especially water supply system in a multi-storey building is monitored, preferably on each floor, and which automatically closes the liquid delivery duct or certain branches thereof, when leakage of liquid, especially water is detected.

Finally, in FIGS. 21 to 23 of the attached drawing, further important applications and installations of the valve assembly of the invention are shown, by way of examples. The balance float controlled valve assembly according to the present invention can be very advantageously designed and ased as a "flood guard" monitoring the leakproof condition of a liquid supply system of premises, workshops or other buildings. The "flood guards" shown in FIGS. 21 to 23 is automatically monitoring and shuts off the delivery duct or certain branches thereof when detecting a leakage or flooding within the system.

With the embodiment depicted in FIG. 21, the valve means 2 of the valve assembly is fitted into a liquid, especially water supply delivery duct 7 of a so-called "sanitary block" of a building. A liquid receptacle 4 of the valve assembly is arranged at a deep point of a floor 8 of the room, as a recess open at the top, for collecting liquid, especially water leaking from the supply system as a result of pipe breakage or any other sealing failure. The balance float 1 of the valve assembly is fixed to the bottom end of the link 5 that is surrounded by tubular protecting cover 50 which at least optionally can be embedded in a wall of the room or building. Based on the description of the operation of several embodiments of the invention further above, it can be seen easily that if as a result of pipe breakage or another sealing failure, liquid appers and collects in the liquid receptacle 4 recessed into the floor 8, the balance float 1 is immersed into the liquid, and through the mechanism 3 the valve means 2 of the valve assembly is moved into its closed valve position whereby the delivery duct 7 is blocked and any further liquid flow or leakage is stopped automatically until the failure is detected and remedied. Optionally, the "flood guide" can also be associated with any suitable signalling device generating suitable audible and/or visible or other signals when having detected a sealing failure in the supply system and the valve means 2 has been actuated.

FIG. 22 shows another arrangement of the "flood guard" described above, wherein due to given local circumstances or the given route of the delivery duct 7, the valve means 2 can not be arranged above the liquid receptacle 4 recessed into the floor 8. Here, the flexible link 5 holding the balance float 1 comprises several strands along its route between the valve means 2 and the balance float 1, and at least some of the strands of the flexible link 5 are, at least partially and optionally again, surrounded with a preferably tubular protecting cover 51. Between the strands the flexible link 5 is guided around preferably freely rotatable pulleys 51. In certain applications, the whole floor section of a room or building can serve as liquid receptacle of the valve assembly. In such applications the balance float of the "flood guard" valve assembly is arranged in the very proximity of the floor level of the room or building for actuating the valve assembly when a certain, preferably low level of liquid is sensed on the floor.

Finally, FIG. 23 shows another embodiments of the valve assembly of the invention, which are installed and applied as a "flood guard" again, in the water supply system of multi-storey buildings. In these embodiments a balance float 1 is rigidly connected to the end of the balance lever 31. The valve means 2 of one of the valve assemblies shown in the drawing figure is installed behind a flow meter 9 into a liquid, preferably water supply delivery duct 7 introduced through the cellar or basement of a multi-storey building, while the valve means 2 of the another valve assembly is mounted into a branch 71 of the delivery duct 7, supplying for example, a bathroom on the ground floor of the building. The liquid receptacles 4 shown are fitted with a removable cover grid 48 for the purpose of emptying and cleaning. The liquid receptacles 4 collect the liquid, especially water leaking from the supply system as a result of pipe breakage or other sealing failure. Liquid receptacles 4 are recessed into floors 8 of the various levels, and the "flood guard" valve assemblies embodying the invention and protecting each level separately against flooding have valve means 2 controlled by balance floats 1 that are rigidly connected to the rotatable free end of the balance lever of the respective valve assembly. The valve assembly is mounted into sections of the delivery duct 7 and the branching 71 respectively, which sections intersect and are located within a respective liquid receptacle 4. In order to prevent serious damage resulting from flooding, valve assemblies of the invention can be applied as a "flood guard" on each level of a multi-storey building, especially at locations where the risk of flooding prevails.

The major advantages of the valve assembly embodying the invention can be summarised as follows:

The rate of closing and opening the valve means does no more depend on the rate of change in the liquid level. The mode of operation and the dynamic characteristics of the valve means can be influenced by appropriate design and dimensioning of the balance float(s), the valve means and the motion-transmission mechanism. The opening and closing characteristics of the valve may be different.

The valve assembly can be designed both, a one-way structure capable of automatically closing the valve means only, and as a two-way assembly which is equally able to close and reopen the valve means depending on the liquid level. Therefore, the extremely wide field of application reaches from the safety "flood guard" function preventing overflow or flooding, to the valve assembly of the invention performing even liquid level control in various industrial plants. Embodiments equipped and operating with two or more suspended balance floats enable the controlled or regulated keeping of especially large level differences.

Valve means having extremely large flow passages can be controlled by at least one low weight balance float, and the valve means may also be remotely located and/or distant from the liquid receptacle. The valve assembly can be so designed that the mechanism is under significant load during the closing and opening of the valve means only.

The valve assemblies of the invention are of relatively simple design, of small size, compact design when compared to their flow passage and of long life when compared to their performance. Embodiments of the invention intended for use in bathrooms can be made at least partly concealed while their exposed parts and embodiments can be designed so as to appear as high standard aesthetic armatures and fittings.

List of reference signs of the drawings

| | | |
|---|---|---|
| balance float | 1, 1a, 1b | |
| float mount | | 10 |
| fitting plug | | 11 |
| rubber sleeve | | 12 |
| housing pipe | | 13 |
| bottom closure | | 14 |
| valve means | 2, 2a, 2b | |
| flow passage | | 20 |
| pressure chamber | | 21 |
| outlet chamber | | 22 |
| closure member | | 23 |
| piston head | | 24 |
| disc | | 241,242 |
| opening | | 243 |
| valve shaft | | 25 |
| sleeve | | 26 |
| casing | | 27 |
| flow strainer | | 28 |
| sound signal device | | 29 |
| mechanism | 3 | |
| compresssion spring | | 30 |
| balance lever | | 31 |
| coupling link | | 32 |
| slotted link bar | | 33 |
| roller | | 34 |
| support surface | | 35 |
| cam disc | | 36 |
| bushing | | 37 |
| liquid receptacle | 4 | |
| outlet valve | | 41 |
| connecting pipe | | 42 |
| check valve | | 43 |
| auxiliary receptacle | | 44 |
| handle bar | | 45 |
| valve | | 46 |
| discharge opening | | 47 |
| cover grid | | 48 |
| link | 5 | |
| protecting cover | | 50 |
| pulley | | 51 |
| valve battery | 6 | |
| bath tub | | 60 |
| discharge orifice | | 61 |
| delivery duct | 7 | |
| branching | | 71 |
| floor | 8 | |
| flow meter | 9 | |

What is claimed is:

1. A balance float controlled valve assembly which includes at least one valve means installed into a liquid flow in a pipeline or a pipeline armature, a liquid receptacle that is fed with at least a part of the liquid flowing through the valve means or escaping, as a result of a sealing failure, from a liquid supply system including said at least one valve means, the valve assembly further including at least one balance float connected to a rotatable free end of a pivoted balance lever, said at least one balance float staying at a higher position above or with respect to the liquid level of the liquid in the receptacle while the liquid level is below a pre-determined or permitted level, and the balance float staying at a lower position with respect to the liquid level of and immersing, at least partially, into the liquid contained in the receptacle when said liquid level reaches or exceeds said pre-determined or permitted level in said receptacle, said valve means comprising a flow passage determined by a valve seat that is arranged between a pressure chamber and an outlet chamber of the valve means, said valve means further comprising a piston-like closure member having a valve shaft and a piston head at one end of said valve shaft, the valve shaft being slideably guided between a first end position and a second end position, said closure member maintaining a thoroughfare flow passage through said valve means in the first end position of the valve shaft, and the closure member closing the flow passage through said valve means when said valve shaft is moved to its other, second end position, the piston head of said closure member being arranged within the pressure chamber of the valve means and the valve assembly further including a mechanism arranged between the balance lever and the valve shaft of the closure member of said valve means, said mechanism being designed so as to having and staying in an at least approximately self-locked state when the valve shaft of the closure member of the valve means stays in its first end position, said at least approximately self-locked state of the mechanism being substantially resistant to forces exerted onto and biassing said valve shaft towards its second end position in the sense of closing the thoroughfare flow passage through said valve means wherein said at least approximately self-locked state of the mechanism is released when said at least one balance float looses, at least partially, its weight by immersing, at least partially, into the liquid contained in the receptacle and the torque exerted on the balance lever by said at least one balance float is reduced, and wherein the at least one balance float is connected to the rotatable free end of the balance lever by means of a flexible link suitable for bearing and transferring tensile load only, the at least one balance float is arranged at any location relative to the at least one valve means, and the at least one balance float is suspended above the liquid receptacle in adjustable relation thereto.

2. The valve assembly as claimed in claim 1, wherein said at least one balance float is divided into several internal compartments or sections, and said internal compartments or sections of the at least one balance float are made of or filled in with structural materials of different density.

3. The valve assembly as claimed in claim 1, wherein the mechanism also includes an energy-storing spring means biassing the closure member of the valve means in the direction of its second end position corresponding to the closed state of said valve means.

4. The valve assembly as claimed in claim 1, wherein several balance floats arranged on and held by the same link are positioned at adjustable distances in relation to both, each other and the receptacle.

5. The valve assembly as claimed in claim 1, wherein said valve assembly includes at least two separate valve means each of them being controlled by the same at least one balance float linked to one single balance lever.

6. The valve assembly as claimed in claim 1, wherein the liquid receptacle is a bath tub, the valve assembly further includes an auxiliary receptacle of relatively small cross-sectional area and of substantially smaller volume relative to those of the bath tub, said auxiliary receptacle is, via a connecting pipe, in at least one way permanent liquid communication with the bath tub by making use of the principle of communicating vessels, the auxiliary receptacle has at its bottom, a discharge opening normally closed by a valve openable by actuating a handle bar, the connecting pipe includes a check valve preventing the flow of liquid from the auxiliary receptacle back to the bath tub, the inner cross section of the connecting pipe is much smaller than that of the discharge opening and the balance float is assigned to the auxiliary receptacle so that the liquid level prevailing in the bath tub is controlled by the balance float as a function of the liquid level in the auxiliary receptacle via the valve means which supplies the bath tub.

7. The valve assembly as claimed in claim 1, wherein said liquid receptacle being a bath tub, and the at least one valve means is associated with a valve battery supplying the bath tub by said at least one valve means that is mounted by means of a releasable coupling, between a discharge outlet and a strainer to existing valve batteries.

8. The valve assembly as claimed in claim 1, wherein the valve means is mounted into a section of a delivery duct which section is located intersecting a liquid receptacle recessed into the floor of at least one room of a building, and said liquid receptacle is designed and arranged for collecting liquid escaping, as a result of a pipe breakage or other sealing defect, from the liquid supply system of the building.

9. The valve assembly as claimed in claim 1, wherein said at least one valve means is installed into at least one delivery duct branch of a delivery duct delivering a liquid into a liquid supply system of a building, at least one liquid receptacle is recessed at a deep point of a building level into the floor of said building, said at least one liquid receptacle serving for collecting liquid escaping, as a result of a pipe breakage or another sealing defect, from said liquid supply system, each of said liquid receptacles are assigned a balance float moving the at least one normally open valve means to its closed position when a pre-determined, specified liquid level is reached in said liquid receptacle, and said balance float connected to the appropriate associated valve means via a flexible link.

10. The valve assembly as claimed in claim 9, wherein said flexible link is guided around freely rotatable pulleys whereby said flexible link comprises several strands along its route between said valve means and said balance float.

11. The valve assembly as claimed in claim 1, wherein the piston head of the closure member of the valve means consists of several discs of different diameters assigned to one another, the disc largest diameter is designed and shaped so as to being capable of keeping the flow passage determined by a valve seat of said valve means in its sealingly closed state, the remaining discs have diameters gradually decreasing towards the pressure chamber of the valve means, the disc of smallest diameter is fixed in a rigid way to the valve shaft, the other discs are allowed of limited displacement along the valve shaft in the direction of latter, the smallest disc fixed on the valve shaft has no openings, while each remaining disc guided in a displaceable way along the valve shaft has at least one opening, and said at least one opening is located in the disc within an area the diameter of which is smaller than the diameter of the next neighbouring smaller disc.

* * * * *